US009379611B2

(12) United States Patent
Zhao

(10) Patent No.: US 9,379,611 B2
(45) Date of Patent: Jun. 28, 2016

(54) SIMO (SINGLE INDUCTOR MULTIPLE OUTPUT) BIDIRECTIONAL DUAL-BOOST ARCHITECTURE

(71) Applicant: Analog Devices, Inc., Norwood, MA (US)

(72) Inventor: Jun Zhao, San Jose, CA (US)

(73) Assignee: Analog Devices, Inc., Norwood, MA (US)

( * ) Notice: Subject to any disclaimer, the term of this patent is extended or adjusted under 35 U.S.C. 154(b) by 71 days.

(21) Appl. No.: 14/521,827

(22) Filed: Oct. 23, 2014

(65) Prior Publication Data

US 2016/0118883 A1    Apr. 28, 2016

(51) Int. Cl.
*G05F 1/10* (2006.01)
*H02M 3/158* (2006.01)

(52) U.S. Cl.
CPC ..................................... *H02M 3/158* (2013.01)

(58) Field of Classification Search
CPC .......... H02M 3/158; H02M 2001/009; H02M 3/156; H02J 7/345
USPC ................. 323/205, 207, 222, 235, 244, 267, 323/282–288; 307/38, 39, 41
See application file for complete search history.

(56) References Cited

U.S. PATENT DOCUMENTS

| 6,075,295 | A  | * | 6/2000  | Li ........................ H02M 3/158 307/38 |
| 6,369,551 | B1 | * | 4/2002  | Blumenkrantz .......... G05F 1/46 323/222 |
| 7,119,521 | B2 | * | 10/2006 | Ishii ................... H02M 3/33561 323/222 |
| 7,176,661 | B2 | * | 2/2007  | Kranz ................... H02M 3/158 323/222 |
| 7,253,592 | B2 | * | 8/2007  | Leyk ..................... H02M 3/158 323/222 |
| 8,674,669 | B2 |   | 3/2014  | Chen |
| 9,099,919 | B2 | * | 8/2015  | Jing ....................... H02M 3/156 |

* cited by examiner

*Primary Examiner* — Rajnikant Patel
(74) *Attorney, Agent, or Firm* — Schwegman Lundberg & Woessner, P.A.

(57) ABSTRACT

A switching power converter circuit comprises an input port, a first circuit supply rail having a first positive voltage greater than circuit ground, a second circuit supply rail having a second positive voltage greater than circuit ground, and an inductor electrically coupled to the input port, wherein inductor current flows in a first direction through the inductor to generate the first circuit supply rail and flows in an opposite direction through the inductor to generate the second circuit supply rail.

21 Claims, 5 Drawing Sheets

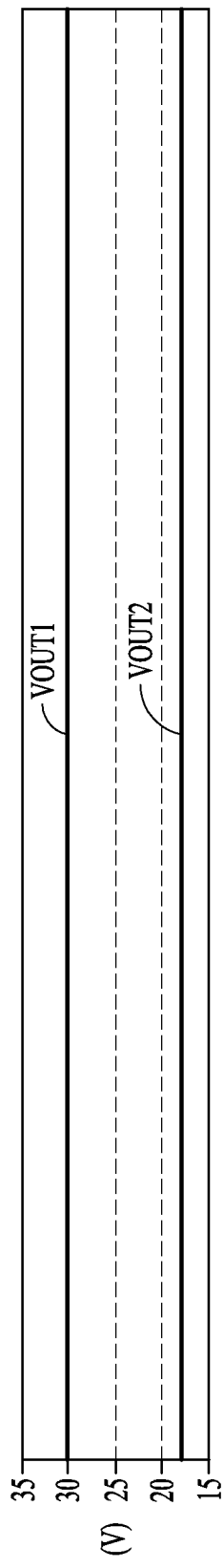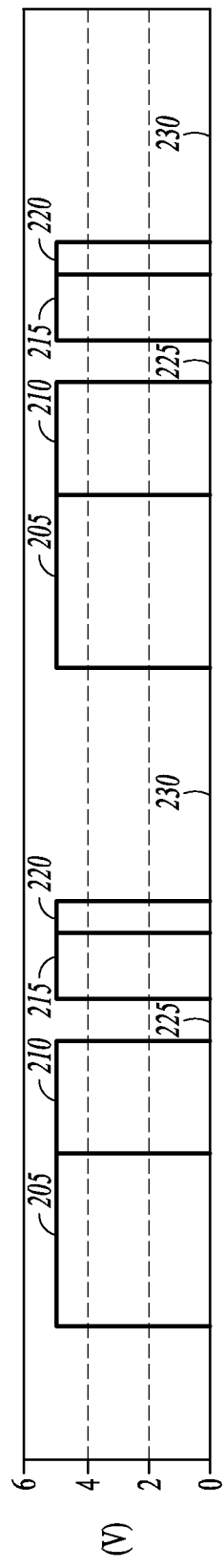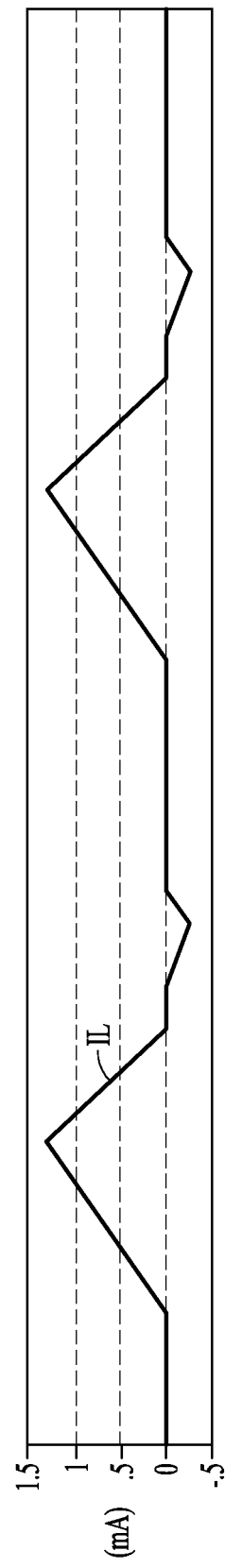

US 9,379,611 B2

SIMO (SINGLE INDUCTOR MULTIPLE OUTPUT) BIDIRECTIONAL DUAL-BOOST ARCHITECTURE

BACKGROUND

Electronic systems can include devices that require a regulated power source. Power converter circuits can be used to provide a circuit supply rail having a regulated voltage. As electronic systems continue to evolve they require more complexity in a smaller size. This can lead to demands on power converter circuits to provide increased complexity and yet have smaller size. The present inventor has recognized a need for improved performance of power converter circuits.

OVERVIEW

This document relates generally to switching power converters and methods of their operation. An example of a switching power converter circuit includes an input port, a first circuit supply rail having a first positive voltage greater than circuit ground, a second circuit supply rail having a second positive voltage greater than circuit ground, and an inductor electrically coupled to the input port, wherein inductor current flows in a first direction through the inductor to generate the first circuit supply rail and flows in an opposite direction through the inductor to generate the second circuit supply rail. An example of a method of operating a power converter circuit includes charging an inductor using energy provided at an input port during a first phase of a first operating cycle, transferring energy from the inductor to a first circuit supply rail during a second phase of the first operating cycle, charging a second supply rail from the first supply rail via a circuit load so that the first circuit supply rail and the second circuit supply rail each have a voltage value greater than circuit ground, providing energy to the inductor from the second circuit supply rail during a first phase of a second operating cycle, and charging the inductor using energy provided at the input port during a second phase of the second operating cycle. Inductor current flows in a first direction through the inductor during the first operating cycle and flows in an opposite direction through the inductor during the second operating cycle.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 2A, 2B, and 2C show results of simulation of operation of the circuit in the example of FIG. 1.

DETAILED DESCRIPTION

Power circuits may need to provide a fixed or stable output voltage as an electrical circuit supply for an electronic system. Some power circuits are switching power circuits that convert the input voltage to a regulated output voltage. The regulated voltage conversion can provide a regulated output voltage that is higher than the input voltage of the regulator, lower than the input voltage, or inverted from the input voltage. The regulation is typically achieved by recurrently charging an inductor from an energy source and then discharging the energy of the inductor to drive a load. The charging and discharging can be accomplished using electronic switches that include transistors. More complicated electronic systems may require multiple circuit supply voltages. An approach to providing multiple voltages is to use a switching power converter circuit having a multiple inductor multiple output (MIMO) topology. The MIMO approach typically requires a large circuit area due to the multiple inductors being discrete components. MIMO circuit can also be inefficient due to the losses associated with switching the multiple inductors. Another approach is to use a switching power converter circuit having a single inductor multiple output (SIMO) topology. This reduces the circuit area required, but SIMO circuits can still be inefficient.

Figure 1:
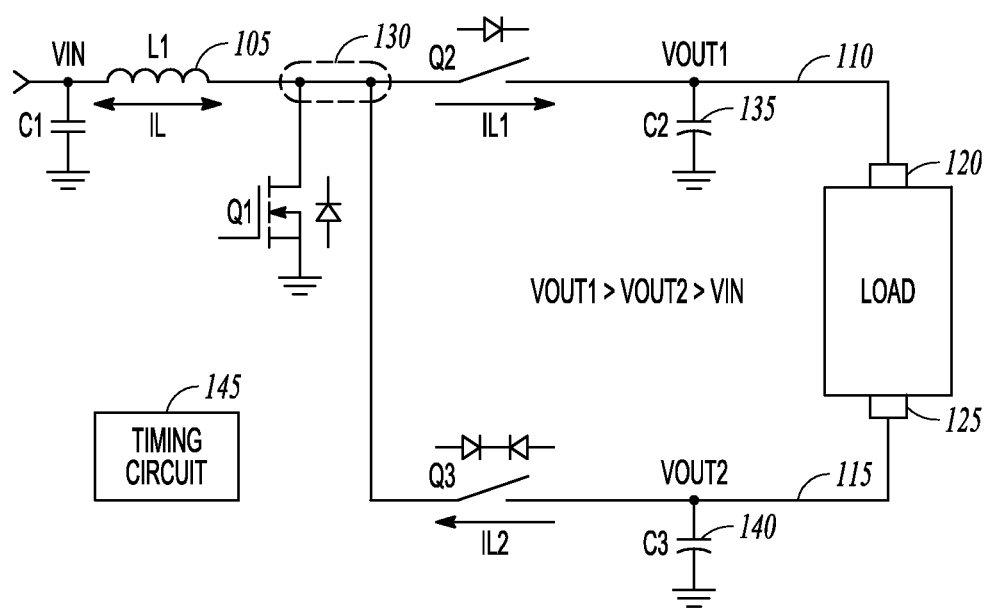
FIG. 1 shows a circuit diagram of an example of a switching power converter circuit.

FIG. 1 shows a circuit diagram of an example of a switching power converter circuit. The circuit includes a single inductor 105 and generates a first circuit supply rail 110 and a second circuit supply rail 115 using a voltage available at the input port (VIN) in which both of the circuit supply rails have positive voltage values greater than circuit ground. The circuit therefore has a SIMO topology. The inductor current (IL) is bidirectional. The inductor current flows in a first direction through the inductor to generate the first circuit supply rail and flows in an opposite direction through the inductor to generate the second circuit supply rail. In some examples, the switching power converter circuit has a boost circuit topology and the first circuit supply rail 110 and the second circuit supply rail 115 both have positive voltages higher than the input voltage. The bidirectional inductor current may increase the efficiency of the circuit while the SIMO topology keeps the circuit area small in size.

The example circuit of FIG. 1 includes a first switch circuit (Q1) electrically connected between a circuit node 130 and circuit ground. The inductor 105 is electrically connected to the circuit node 130 and the input port. The circuit also includes a second switch circuit (Q2) electrically connected between the circuit node and the first circuit supply rail 110, and a third switch circuit (Q3) electrically connected between the circuit node 130 and the second circuit supply rail 115. The switch circuits Q1 and Q2 may be transistors that include the body diodes as shown in the Figure. Switch circuit Q3 may be a transistor having a back-to-back diode structure as shown in the Figure. The circuit also includes a first output port 120 electrically connected to the first circuit supply rail 110, and a second output port 125 electrically connected to the second circuit supply rail 115. The output ports provide an electrical connection to a circuit load.

Operation of the circuit includes alternating between a first operating cycle and a second operating cycle. Timing circuit 145 may provide the electrical signals to configure the switches to be active or inactive for the operating cycles. The timing circuit 145 may include logic to provide the signals. The logic may be implemented in one or more of hardware, firmware, and software.

FIGS. 2A, 2B, and 2C show results of simulation of operation of the circuit in the example of FIG. 1. During the first phase of the first operating cycle 205 in FIG. 2B, the first switch Q1 is active or on, and energy is provided to the inductor 105 from the input port. As shown in FIG. 2C, the inductor current IL is positive and increasing, and in FIG. 1 IL flows in the left to right direction through the inductor. During the second phase of the first operating cycle 210 in FIG. 2B, Q1 is inactive or off, and Q2 is on. When Q2 is on, energy is provided from the inductor 105 to the first circuit supply rail 110. As shown in FIG. 2C, the inductor current IL is positive and decreasing during the second phase of the first operating cycle. In FIG. 1, the inductor current still flows in the left to right direction through the inductor during this phase.

In certain examples, the circuit includes a first capacitor 135 electrically coupled to the first circuit supply rail 110 and a second capacitor 140 electrically coupled to the second supply rail 115. When Q2 is on, current flows through the circuit load to the second capacitor 140, and the first capacitor 135 and the second capacitor 140 are charged.

The second operating cycle follows the first operating cycle. During the first phase of the second operating cycle 215 in FIG. 2B, switches Q1 and Q2 are off and switch Q3 is on. When the third switch Q3 is on, energy is supplied to the inductor from the second circuit supply rail 115. The energy may be supplied to the inductor 105 using charge stored on the second capacitor 140. Current flows in the right to left direction through the inductor during this phase. As shown in FIG. 2C, the inductor current IL is negative and increasing in magnitude during the first phase of the second operating cycle 215.

During the second phase of the second operating cycle 220 in FIG. 2B, switches Q2 and Q3 are off and switch Q1 is on. The inductor current IL is negative and decreasing in magnitude during the second phase of the second operating cycle 220. Current still flows in the right to left direction through the inductor during this phase. The top waveform shows the resulting voltages at VOUT1 and VOUT2 at the first and second circuit supply rails. In the example, the voltage at the input port VIN was 12 volts (12V). The simulation results show that both the first circuit supply and the second circuit supply are boosted to voltage values greater than the input voltage with VOUT1 (about 30V) greater than VOUT2 (about 18V). The circuit load is therefore connected above circuit ground between 30V and 18V in the example.

Operation of the switching power converter circuit may include a third phase in the operating cycles in which switches Q1, Q2, and Q3 are off. The third phase is shown in FIG. 2B as 225 in the first operating cycle and 230 in the second operating cycle. Because the switches are off, FIG. 2C shows an example where charging of the inductor is discontinuous. In some variations, the charging of the inductor is continuous and the first and second operating cycles do not include the third phase where the switches Q1, Q2, and Q3 are off.

The circuit operation described in regard to FIGS. 2A, 2B, and 2C may relate to a normal operating mode provided by the timing circuit 145 after circuit startup. According to some examples, the timing circuit 145 operates the circuit in a startup mode to reach a normal operating condition before changing to the normal operating mode. Both the startup mode and the normal operating mode have a first operating cycle and a second operating cycle. The first operating cycle is the same in the startup mode and the normal operating mode. The difference is in the second operating cycle. In the second operating cycle, the order of activation of the first switch and the third switch is reversed. During the first phase of the second operating cycle, the first switch Q1 is on and Q3 is off to charge the inductor 105 using energy provided at the input port. During the second phase of the second operating cycle, the third switch Q3 is on and the first switch Q1 is off to provide energy to the second circuit supply rail from the inductor. In contrast to the normal operating mode, inductor current flows in the same direction for both the first and second operating cycles during startup mode.

The startup mode may shorten the startup time for the circuit by bringing the second circuit supply to its operating voltage more quickly. In certain examples, the timing circuit 145 may change operation from the startup mode to the normal operating mode when one or both of first supply circuit and the second supply circuit reach specified threshold voltage values. The switchover threshold point may be detected using a comparator circuit (not shown). In certain examples, instead of checking for a threshold voltage, the timing circuit 145 operates the circuit in startup mode for a specified number of operating cycles before transitioning to the normal operating mode.

Figure 3:
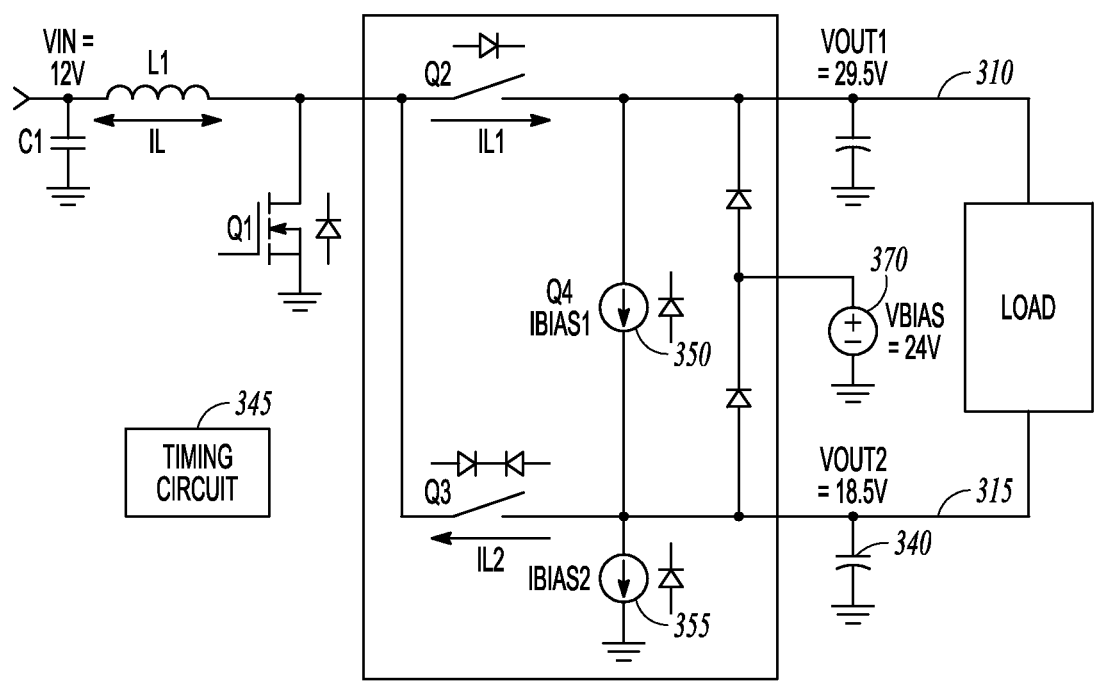
FIG. 3 shows a circuit diagram of another example of a switching power converter circuit.

FIG. 3 shows a circuit diagram of another example of a switching power converter circuit. The circuit shows many of the same elements as the example shown in FIG. 1. However, this circuit includes a current source circuit 350 electrically connected to the first circuit supply rail 310 and selectively sources current to the second circuit supply 315. The current source circuit 350 may be used as an alternative to the startup mode discussed previously. During startup, the current source circuit 350 is enabled and charges the second capacitor 340. The current source circuit 350 may be enabled for a specified number of operating cycles, or the current source circuit 350 may be enabled until the second circuit supply 315 reaches a specified threshold voltage value.

The circuit example of FIG. 3 also includes a current sink circuit 355 electrically connected to the second circuit supply rail and selectively sinks current from the second circuit supply rail to circuit ground. This may be useful to more quickly shut the circuit down for circuit application reasons or for circuit protection reasons.

The circuit example of FIG. 3 also includes two diodes connected between the first circuit supply rail 310 and the second circuit supply rail 315. The first diode 360 has a cathode electrically connected to the first circuit supply rail 310 and an anode electrically connected to a circuit node 370. The second diode 365 has a cathode electrically connected to the circuit node 370 and an anode electrically connected to the second circuit supply rail 315. In certain examples, the diodes are Schottky diodes. In certain examples, the diodes clamp the voltage at circuit node 370 between a value of the voltage at the first circuit supply rail 310 and a value of the voltage at the second voltage supply rail 315.

The voltage at circuit node 370 can be useful to provide a third voltage as a bias voltage or a third supply voltage. If the voltage value at circuit node 370 is clamped between the value of the voltage at the first circuit supply rail 310 and the value of the voltage at the second voltage supply rail 315 (e.g., VOUT1≥VBIAS≥VOUT2) the voltage at 370 can be supplied to circuit elements (not shown in FIG. 3) to protect against the risk of a voltage developing that is negative with respect to the circuit supply rails causing damage to the circuit elements.

Figure 4:
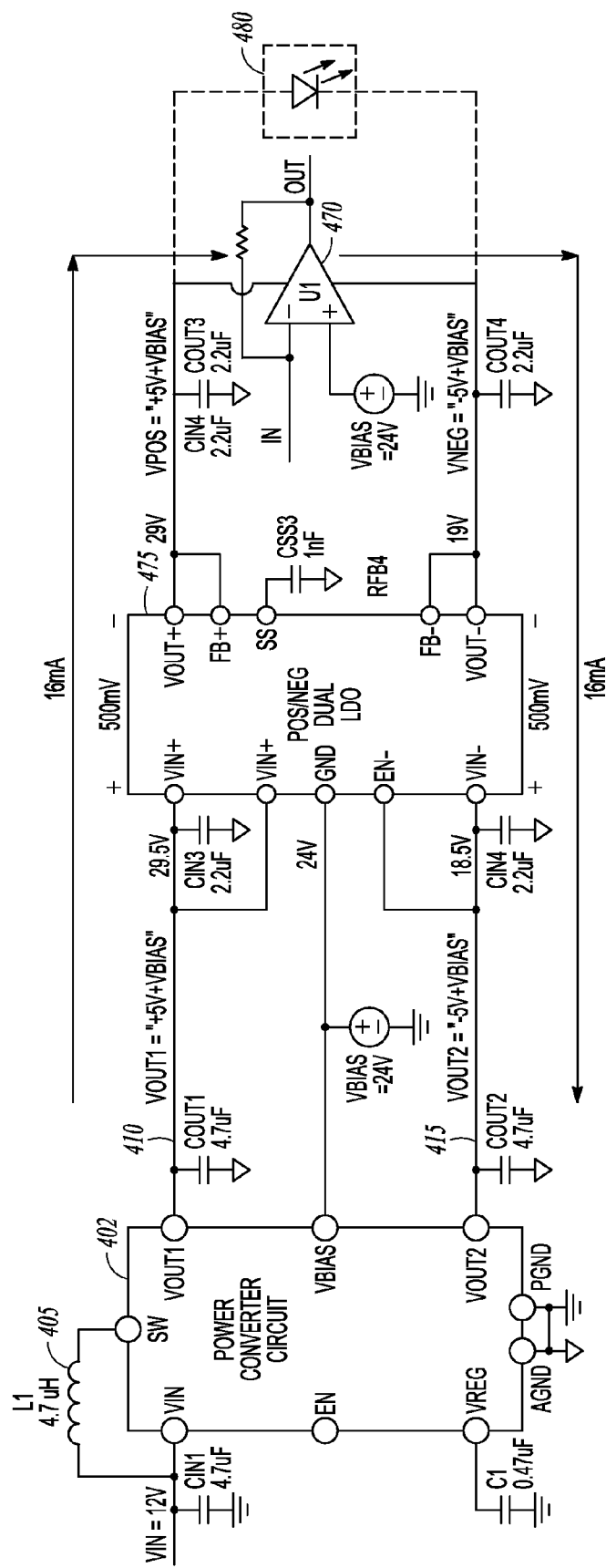
FIG. 4 shows a block diagram of portions of an electronic system that includes a switching power converter circuit.

FIG. 4 shows a block diagram of portions of an electronic system that includes a switching power converter circuit. The switching power converter circuit is shown as circuit block 402 which is electrically connected to inductor 405. In some examples, the topology of the switching power converter in FIG. 4 has the circuit topology of the example of FIG. 1 or the example of FIG. 3. The switching power converter circuit of FIG. 4 generates a first circuit supply rail 410 and a second circuit supply rail 415. As in the examples of FIG. 1 and FIG. 3, inductor current flows in a first direction through the inductor 405 to generate the first circuit supply rail 410 and flows in an opposite direction through the inductor 405 to generate the second circuit supply rail 415.

In the example of FIG. 4, the circuit load to the switching power converter circuit is amplifier circuit 470. In certain examples, the amplifier circuit amplifies electrical signals having a signal frequency in an audio frequency range. This may be useful to provide power to a speaker for instance. The amplifier circuit 570 is shown in an inverting configuration, but this is shown only as an example and other configurations and other circuits can be used as the circuit load. Voltage VBIAS may be a voltage value clamped between the circuit supply rails to prevent a voltage negative with respect to the circuit supply rails causing damage to the amplifier circuit 470.

In some examples, the circuit load for the system includes a diode circuit 480 (e.g., a light emitting diode (LED) or laser diode circuit). The first circuit supply rail and the second circuit supply rail provide biasing above ground for the diode circuit. In certain examples, the electronic system in FIG. 4 includes a low dropout (LDO) voltage regulator circuit electrically connected to the first circuit supply rail 410 and to the second circuit supply rail 415 to provide regulated voltages to the amplifier circuit 470. The LDO voltage regulator circuit 475 may have 500 millivolts (500 mV) of headroom from the first and second circuit supply rails.

Figure 5:
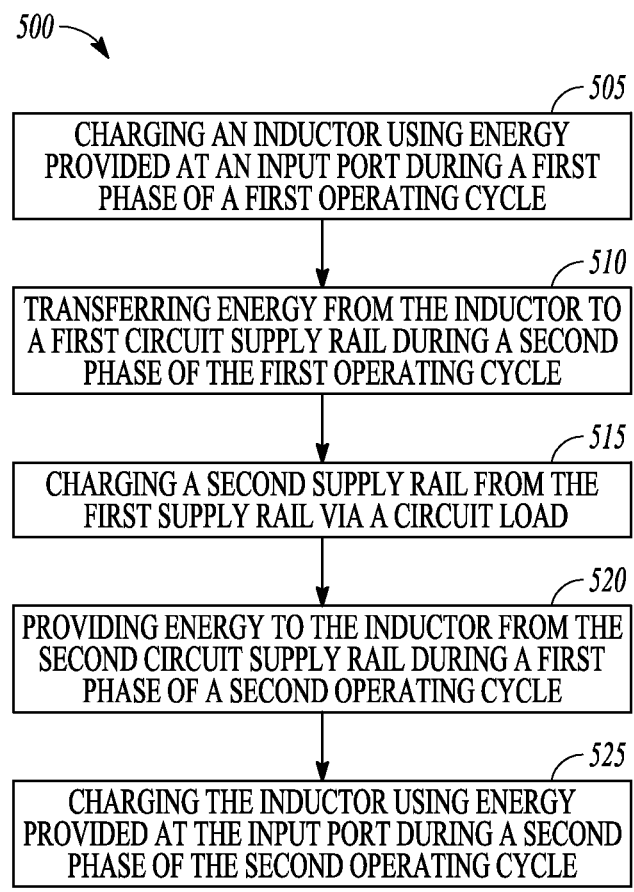
FIG. 5 shows a flow diagram of a method of operating a power converter circuit.

For completeness, FIG. 5 shows a flow diagram of a method 500 of operating a power converter circuit, such as the example circuits in FIG. 1, FIG. 3, and FIG. 4. The method may correspond to a normal mode of operation and may include alternating between a first operating cycle and a second operating cycle.

At 505, an inductor of the circuit is charged using energy provided at an input port during a first phase of a first operating cycle. At 510, energy is transferred from the inductor to a first circuit supply rail during a second phase of the first operating cycle.

At 515, a second circuit supply rail is charged by the first circuit supply rail via a circuit load. The first circuit supply rail and the second circuit supply rail are electrically connected by a circuit path through the circuit load. The first circuit supply rail and the second circuit supply rail each have a voltage value greater than circuit ground. In some variations, the first circuit supply rail and the second circuit supply rail each have a voltage value greater than the input voltage at the input port.

At 520, energy to the inductor is provided from the second circuit supply rail during a first phase of a second operating cycle. At 525, the inductor is again charged using energy provided at the input port during a second phase of the second operating cycle. Inductor current flows in a first direction through the inductor during the first operating cycle and flows in an opposite direction through the inductor during the second operating cycle. The switching power converter circuit allows a circuit load to be connected between two circuit supply rails having a positive voltage, which allows the load to float above circuit ground The several examples of systems, devices, and method described can be used to provide a regulated voltage as an electrical circuit supply for an electronic system. The regulated circuit supply is provided with improved energy efficiency and with a small circuit footprint.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A switching power converter circuit comprising:
an input port;
a first circuit supply rail having a first positive voltage greater than circuit ground;
a second circuit supply rail having a second positive voltage greater than circuit ground; and
an inductor electrically coupled to the input port, wherein inductor current flows in a first direction through the inductor to generate the first circuit supply rail and flows in an opposite direction through the inductor to generate the second circuit supply rail.

2. The switching power converter circuit of claim 1, including:
a first switch circuit electrically connected between a first circuit node and circuit ground, wherein the inductor is electrically connected to the first circuit node, and wherein the first switch circuit is configured to provide energy to the inductor from the input port when active;
a second switch circuit electrically connected between the first circuit node and the first circuit supply rail, wherein the second switch circuit is configured to provide energy from the inductor to the first circuit supply rail when active; and
a third switch circuit electrically connected between the first circuit node and the second circuit supply rail, wherein the third switch circuit is configured to provide energy to the inductor from the second circuit supply rail when active and operating in a normal operating mode.

3. The switching power converter circuit of claim 2, including a first capacitor electrically coupled to the first circuit supply rail and a second capacitor electrically coupled to the second circuit supply rail, wherein the second switch circuit is configured to charge the first capacitor using the energy provided from the inductor and the third switch circuit is configured to provide energy to the inductor using charge from the second capacitor.

4. The switching power converter circuit of claim 2, wherein the input port has an input voltage value greater than circuit ground, the first circuit supply rail has a first voltage value greater than the input voltage value, and the second circuit supply rail has a second voltage value greater than the input voltage value.

5. The switching power converter circuit of claim 2, including a timing circuit configured to operate the power converter circuit in a normal operating mode and in a startup mode including:
activating the third switch circuit to provide energy to the inductor from the second circuit supply rail when operating in the normal operating mode; and
activating the third switch circuit to provide energy to the second circuit supply rail from the inductor in the startup mode,
wherein, when in the startup mode, the inductor current flows in the first direction through the inductor to generate the first circuit supply rail and flows in the first direction through the inductor to generate the second circuit supply rail, and when in the normal operating mode, the inductor current flows in the first direction through the inductor to generate the first circuit supply rail and flows in the opposite direction through the inductor to generate the second circuit supply rail.

6. The switching power converter circuit of claim 1, including a current source electrically connected to the first circuit supply rail and configured to selectively source current to the second circuit supply rail during a startup mode of operation.

7. The switching power converter circuit of claim 1, including a current source electrically connected to the second circuit supply rail and configured to selectively sink current from the second circuit supply rail to ground.

8. The switching power converter circuit of claim 1, including a first output port electrically connected to the first circuit supply rail and a second output port electrically connected to the second circuit supply rail, wherein the first and second output ports are configured for electrical connection to a circuit load.

9. The electronic system of claim 8, including a diode circuit electrically connected to the first and second output ports.

10. The switching power converter circuit of claim 1, including:
a first diode having a cathode electrically connected to the first circuit supply rail and an anode electrically connected to a second circuit node; and
a second diode having a cathode electrically connected to the second circuit node and an anode electrically connected to the second circuit supply rail, wherein a voltage at the second circuit node is clamped between a value of the voltage at the first circuit supply rail and a value of the voltage at the second voltage supply rail.

11. An electronic system comprising:
a switching power converter circuit comprising:
an input port;
a first circuit supply rail having a first positive voltage greater than circuit ground;
a second circuit supply rail having a second positive voltage greater than circuit ground; and
an inductor electrically coupled to the input port, wherein inductor current flows in a first direction through the inductor to generate the first circuit supply rail and flows in an opposite direction through the inductor to generate the second circuit supply rail; and
an amplifier circuit including a first amplifier supply connection and a second amplifier supply connection that are electrically connected to the first circuit supply rail and the second circuit supply rail, respectively.

12. The electronic system of claim 11, wherein the switching power converter circuit includes:
a first switch circuit electrically connected between a first circuit node and circuit ground, wherein the inductor is electrically connected to the first circuit node, and wherein the first switch circuit is configured to provide energy to the inductor from the input port when active;
a second switch circuit electrically connected between the first circuit node and the first circuit supply rail, wherein the second switch circuit is configured to provide energy from the inductor to the first circuit supply rail when active; and
a third switch circuit electrically connected between the first circuit node and the second circuit supply rail, wherein the third switch circuit is configured to provide energy to the inductor from the second circuit supply rail when active.

13. The electronic system of claim 12, including a first capacitor electrically coupled to the first circuit supply rail and a second capacitor electrically coupled to the second circuit supply rail, wherein the second switch circuit is configured to charge the first capacitor using the energy provided from the inductor and the third switch circuit is configured to provide energy to the inductor using charge from the second capacitor.

14. The electronic system of claim 11, wherein the amplifier circuit is configured to amplify electrical signals having a signal frequency in an audio frequency range.

15. A method of operating a power converter circuit, the method comprising:
charging an inductor using energy provided at an input port during a first phase of a first operating cycle;
transferring energy from the inductor to a first circuit supply rail during a second phase of the first operating cycle;

charging a second supply rail from the first supply rail via a circuit load, wherein the first circuit supply rail and the second circuit supply rail each have a voltage value greater than circuit ground;

providing energy to the inductor from the second circuit supply rail during a first phase of a second operating cycle; and charging the inductor using energy provided at the input port during a second phase of the second operating cycle, wherein inductor current flows in a first direction through the inductor during the first operating cycle and flows in an opposite direction through the inductor during the second operating cycle.

16. The method of claim 15, wherein the input port has an input voltage value greater than circuit ground, and wherein transferring energy from the inductor to a first circuit supply rail and a second circuit supply rail includes boosting the voltage values of the first circuit supply rail and the second circuit supply rail to voltage values greater than the input voltage value.

17. The method of claim 15,
wherein charging an inductor using energy provided at an input port includes activating a first switch circuit electrically connected to the inductor and circuit ground during the first phase of the first operating cycle,
wherein transferring energy from the inductor to a first circuit supply rail and a second circuit supply rail includes deactivating the first switch circuit and activating a second switch circuit connected between the inductor and the first circuit supply rail during the second phase of the first operating cycle, and
wherein providing energy to the inductor from the second circuit supply rail includes activating a third switch circuit electrically connected between the inductor and the second circuit supply rail during the first phase of the second operating cycle.

18. The method of claim 17, wherein charging the inductor using energy provided at the input port includes deactivating the third switch circuit and activating the first switch circuit during the second phase of the second operating cycle.

19. The method of claim 15, including operating the power converter circuit in a startup mode, wherein the startup mode includes:
charging the inductor using energy provided at the input port during a first phase of the second operating cycle; and
providing energy to the second circuit supply rail from the inductor during a second phase of a second operating cycle,
wherein inductor current flows in the first direction through the inductor during the first operating cycle during the startup mode and also flows in the first direction through the inductor during the second operating cycle during the startup mode.

20. The method of claim 15, wherein transferring energy from the inductor to a first circuit supply rail and a second circuit supply rail includes enabling current to flow in the inductor according to a discontinuous conduction mode in which current flow in the inductor is disabled during a third phase of the first operating cycle and a third phase of the second operating cycle.

21. The method of claim 15,
wherein transferring energy from the inductor to a first circuit supply rail includes charging a first capacitor electrically connected to the first circuit supply rail and charging, via the circuit load, a second capacitor electrically connected to the second circuit supply rail, and
wherein providing energy to the inductor from the second circuit supply rail includes providing energy to the inductor using charge from the second capacitor during the first phase of the second operating cycle.

* * * * *